(12) United States Patent
Albert

(10) Patent No.: US 6,512,970 B1
(45) Date of Patent: Jan. 28, 2003

(54) ELECTRONIC CONTROL DEVICE FOR CONTROLLING AUTONOMOUSLY CONTROLLABLE ASSEMBLIES

(75) Inventor: Christian Albert, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/485,611
(22) PCT Filed: Aug. 7, 1998
(86) PCT No.: PCT/EP98/05013
§ 371 (c)(1), (2), (4) Date: Feb. 14, 2000
(87) PCT Pub. No.: WO99/09311
PCT Pub. Date: Feb. 25, 1999

(30) Foreign Application Priority Data

Aug. 14, 1997 (DE) ............................................ 197 35 319

(51) Int. Cl.$^7$ ............................................. G06F 17/00
(52) U.S. Cl. ............................ 701/48; 701/29; 701/36; 701/33; 701/115
(58) Field of Search ............................... 701/48, 29, 36, 701/31, 33, 35, 115, 102; 73/118.1, 117.3, 116; 340/438, 439, 459; 714/23, 46, 24; 702/185, 182, 183; 706/905, 911

(56) References Cited

U.S. PATENT DOCUMENTS

| | | | |
|---|---|---|---|
| 4,337,513 A | 6/1982 | Furuhashi | 701/114 |
| 4,410,938 A | 10/1983 | Higashiyama | 714/47 |
| 4,853,850 A * | 8/1989 | Krass, Jr. et al. | 701/114 |
| 4,888,687 A * | 12/1989 | Allison et la. | 711/5 |
| 5,148,542 A * | 9/1992 | Sakuma et al. | 709/107 |
| 5,159,674 A | 10/1992 | Stadlmeier et al. | 712/207 |
| 5,200,900 A * | 4/1993 | Adrian et al. | 701/115 |
| 5,212,633 A * | 5/1993 | Franzmeier | 703/23 |
| 5,278,759 A * | 1/1994 | Berra et al. | 701/36 |
| 5,293,317 A * | 3/1994 | Adrian et al. | 701/115 |
| 5,394,538 A * | 2/1995 | Wada et al. | 711/171 |
| 5,479,347 A * | 12/1995 | Oguro et al. | 701/35 |
| 5,483,692 A | 1/1996 | Person et al. | 455/238.1 |
| 5,684,974 A * | 11/1997 | Onodera | 709/1 |
| 5,790,965 A * | 8/1998 | Abe | 701/29 |
| 5,905,725 A * | 5/1999 | Sindhu et al. | 370/389 |
| 6,052,632 A * | 4/2000 | Iihoshi et al. | 701/36 |
| 6,081,755 A * | 6/2000 | Fujimoto | 701/1 |
| 6,108,598 A * | 8/2000 | Sumitani | 701/29 |
| 6,119,146 A * | 9/2000 | Heller et al. | 345/685 |
| 6,192,331 B1 * | 2/2001 | Gaessler et al. | 703/22 |

FOREIGN PATENT DOCUMENTS

| | | |
|---|---|---|
| JP | 58-132807 | 8/1983 |
| JP | 02-105251 | 4/1990 |
| JP | 08-244499 | 9/1996 |

* cited by examiner

Primary Examiner—Jacques H. Louis-Jacques
(74) Attorney, Agent, or Firm—Crowell & Moring LLP

(57) ABSTRACT

The invention relates to an electronic control unit for controlling individual, autonomously controlled assemblies. The inventive electronic control unit comprises a central control device, a memory and control interfaces. The memory has several non-overlapping memory zones, each of which is assigned a diagnostic address and a programming address. The central control device is connected to the different memory zones in such a way that it cooperates with these in a time division multiplex, thus forming a virtual control unit for each assembly. The central control device has a diagnostic interface, and is so designed that the memory are assigned to the respective address can be accessed individually from outside by means of the diagnostic interface and using the addresses. Furthermore, the control interfaces are also connected to the central control device, and a control interface is assigned to each virtual control unit. The electronic control unit is used for controlling autonomously controlled assemblies in motor vehicles.

10 Claims, 1 Drawing Sheet

ELECTRONIC CONTROL DEVICE FOR CONTROLLING AUTONOMOUSLY CONTROLLABLE ASSEMBLIES

BACKGROUND AND SUMMARY OF THE INVENTION

The invention relates to an electronic control device for controlling autonomously controllable assemblies, as well to a use of the electronic control device as a central vehicle control electronic system.

Control and regulation technology is playing a major role in electrical engineering. Since the beginning of modern microelectronics, many mechanical controls and regulating devices have been supplemented or replaced by electronic controls and regulating devices. Intelligent microprocessors are playing an important role in the ongoing development of electronic control and regulation technology. They are also indispensable in the private sector as a result of the accelerated price drop in microprocessors. Many electronic control and regulating devices are therefore designed based on a microprocessor (microcontrollers and signal processors, for example).

One advantage of computer-controlled control and regulating devices is that the algorithm that forms the basis of the control or regulation can be in the form of a computer program stored in a memory. A computer program of this kind can be replaced easily so that the corresponding control or regulating device can be updated simply and rapidly without having to replace the device itself. In addition, highly complex control or regulating algorithms can be created relatively simply for use in computer-controlled control and regulating devices whose circuitry replacement would otherwise be highly complex, extensive, and consequently cost-intensive. New goals can also be achieved that would not have been possible using analog technology.

Many systems have a plurality of autonomously controllable assemblies that are controlled by using a plurality of control devices to perform the tasks for which the system is designed. Since a single independently operating control device is associated with each authorized autonomously controllable assembly, the system is transparent so that the control devices can be developed, maintained, and updated independently of one another.

If the system is offered by the manufacturer with different equipment on the autonomously controllable assemblies, it has different control devices depending on how it is equipped. The number of combinations of controllable assemblies can be increased further on special order from the customer. The large number of possible combinations of controllable assemblies makes the system inflexible, however, which makes it more difficult to manufacture, more expensive and difficult to produce.

As a rule, only limited space is available for control devices in such a system so that the control devices must be located close together. If this available space is small, it may be difficult to locate the control devices in this space because of their large numbers and sizes, and to maintain and update them.

Another problem is the frequently high manufacturing costs of the plurality of different control devices.

A typical example of the system mentioned above is a motor vehicle having motor vehicle electronics with computer-controlled control devices. Controls such as engine control (DME) or transmission control are made using such computer-controlled electronic control devices so that a plurality of control devices is present in the motor vehicle. Usually, a motor vehicle is offered by the manufacturer with different equipment with controllable assemblies so that, depending on the equipment, different control devices must be installed in the motor vehicle, making the manufacture of the motor vehicle cumbersome and expensive. In addition, there is only limited space in a motor vehicle for the control devices so that locating the control devices may be problematic because of their large number and size. In addition, competition in the motor vehicle market is brisk so that the manufacturing costs of the control devices as well as the cost of their installation in the motor vehicle must be as low as possible.

The goal of the invention is to develop the control tasks, which fall within the framework of the system, flexibly, economically, and compactly while maintaining transparency.

This is accomplished according to the invention with an electronic control device for controlling separate autonomously controllable assemblies that has a central control device, a memory, and control interfaces. The memory has several memory areas that do not intersect one another, each having its own diagnostic address and programming address. The central control device is connected to each of the memory areas, cooperating with the latter in a time multiplex fashion, forming a virtual control unit associated with the respective module. The central control device also has a diagnostic interface, and is so designed that its storage area associated with each address can be accessed from outside using the diagnostic or programming addresses. In addition, the control interfaces are connected to the central control device in such fashion that one of the control interfaces is associated with each virtual control unit.

The central control device of the control system according to the invention has a microprocessor with whose aid the access of the central control device to the respective memory area can be changed so quickly that the time required for a single access of the microprocessor to each of the storage areas associated with a virtual control unit is negligibly small by comparison with the relevant control times for controlling the assemblies. Thus, the electronic control device according to the invention creates the impression that the virtual control units are available simultaneously.

According to the invention, the central control unit has a diagnostic interface suitable for data input and output. The central control unit is so designed that each of the storage areas can be accessed separately from outside using the diagnostic address or programming address associated with the respective memory area through the diagnostic interface. Depending on the individual address, the central control device creates a connection between the diagnostic interface and the address memory area such that the data stored in each of the addressed memory areas and associated with the respective virtual control units can be called up, updated, documented, and deleted independently of the data stored in the other memory areas. The diagnostic address allows access to the working data stored in the memory area while the computer program that forms the basis of each virtual control unit can be accessed through the programming address.

Since each virtual control unit has associated with it a control interface that is separate from the control interfaces of the other virtual control units, the virtual control units of the control device according to the invention are completely independent of one another or autonomous as far as their control functions are concerned. The control device according to the invention therefore means that a plurality of assemblies of a system can be controlled by a single control device. This is because the single control device has a plurality of virtual control units, each adapted to one of the assemblies and associated therewith. Since the virtual control units can be adjusted in simple fashion to the respective assemblies, the control device according to the invention has a high degree of flexibility.

Since a single control device according to the invention combines the functions of a plurality of control devices from the prior art and a portion of the hardware of the electronic control device according to the invention is utilized several times efficiently in a time multiplex manner, considerable cost and space savings are effected. In addition, the control device according to the invention, depending on the system equipment, can have virtual control units that differ with respect to the control function while the hardware remains the same. Thus, manufacturing of the system with different equipment variations is significantly simplified.

The transparency of the control device according to the invention is retained, since the virtual control units operate independently of one another and can be accessed separately for the data associated with each virtual control unit. Since separate access to the individual virtual control units is possible, the computer program can be changed separately for each individual virtual control unit, for example for updating the program. This brings the additional advantage that the computer programs that form the basis of the virtual control units are independent of one another and can therefore be developed by different departments of a company for example.

According to one preferred embodiment of the control device according to the invention, the number of available virtual control units of the control device is greater than the number of controllable groups in the system in which the control device is used. As a result, when it is necessary to expand the system subsequently by additional controllable assemblies, the control device according to the invention can be expanded in terms of its control function by simply connecting an appropriate free control unit without any hardware modifications.

The memory can be a dynamic or a static memory or an EPROM/flash-EPROM and consist of a memory module or a plurality of memory modules. In addition, each of the memory areas can be designed as independent memory modules so that each of the virtual control units has an independent memory module.

The control interfaces can be designed as digital or analog interfaces. It is also possible for control interfaces to be switched individually or together from digital operating mode to analog operating mode and vice versa, or for the control interfaces to be divided into a plurality of interface areas which in turn form analog or digital interfaces. For wireless signal transmission, the control interfaces can have transmitters and receivers for ultrasound or electromagnetic waves so that the number of electrical leads required between the electronic control device and the autonomously controllable assemblies can be reduced. Communication between the electronic control device according to the invention and the individual controllable assemblies through a power supply line is contemplated. In this case, a control interface is understood to be a device by which signals can be sent and/or received over a power supply line.

The control device according to the invention can be used in a variety of systems in which a plurality of autonomously controllable assemblies is to be controlled. Preferably, the control device according to the invention is used in a motor vehicle forming central vehicle control electronics. Since digital engine electronics with a high-performance microprocessor are often installed routinely in a motor vehicle, said microprocessor being able to assume other tasks besides engine control, the control device according to the invention can be built on the basis of such a digital engine control.

Preferably, a first virtual control unit serves as an engine control and a second virtual control units serves as a transmission control. Other autonomously controllable assemblies for a motor vehicle include, for example, an ABS system, an anti-slip system, or an airbag, with each of these assemblies being located in the motor vehicle depending on the equipment and controlled by a virtual control unit of the control device according to the invention.

Intelligent sensors are being used increasingly in modern automobile electronics. Such intelligent sensors have computer-controlled evaluation electronics that control the sensor itself. Signals output therefrom can be processed and prepared so that they can be used without large expenditure, for example the conversion of the sensor signal to a signal that is linearly dependent on the measured physical parameter. As a result of unfavorable environmental conditions that frequently occur at the sensor locations, the computer-controlled evaluation electronics of the sensor are often not located at the sensor location but rather separately from the sensor itself. Thus, it is possible to form the computer-controlled evaluation electronics of an intelligent sensor by using the electronic control device according to the invention. Therefore, a third virtual control unit of the control device according to the invention can be used as evaluation electronics for such an intelligent sensor, for example an oil level sensor. In addition, virtual control units of the control device according to the invention can be designed so that they control or can control a rollover sensor or a lambda probe if these are present in the vehicle.

For some intelligent sensors and for controlling a few controllable assemblies on the motor vehicle, common data, certain engine data for example, are necessary. These common data can be stored redundantly in each of the memory areas associated with each of the corresponding virtual control units. Preferably, however, the control device according to the invention has a public memory area for storing common data; each virtual control unit can access these common data so that redundant storage of common data is avoided. The public storage area can be part of the memory of the electronic control device or part of the working memory of the central control device. An independent memory module can also be provided for the public memory area.

Regardless of the wording used above, a controllable assembly can also be a regulatable assembly and the virtual control unit can also be a virtual regulating unit.

The invention will now be described in greater detail with reference to a preferred embodiment, referring to the drawing.

DETAILED DESCRIPTION OF THE DRAWINGS

Figure 1:
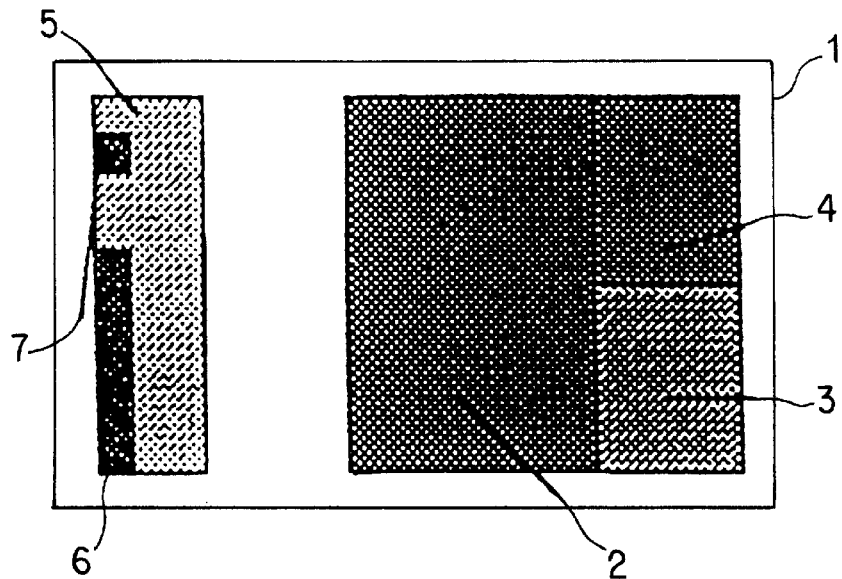
FIG. 1 is a schematic view of one embodiment of an electronic control device according to the invention.
Figure 2:
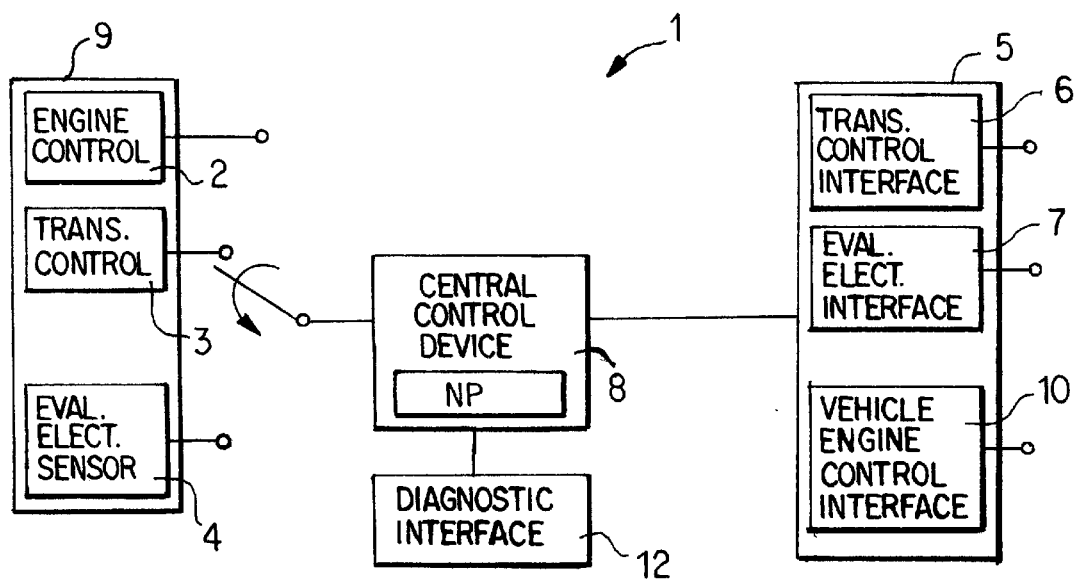
FIG. 2 is a schematic block diagram of the embodiment in FIG. 1.

As can be seen from FIGS. 1 and 2, the electronic control device 1 is provided with a central control device 8 (not shown in FIG. 1), a memory 9, and control interfaces 5. Memory 9 has three memory areas 2, 3, and 4 that do not intersect or overlap; each memory area 2, 3, 4, together with the central control device 8, forms a virtual control unit. A first virtual control unit is used as the vehicle engine control, a second virtual control unit is used as a motor vehicle transmission control, and a third virtual control unit is used as evaluation electronics for an oil level sensor. The control interfaces 5 are provided for transmitting signals from the virtual control units to the respective controllable assemblies, and vice versa. A first control interface 10 (not shown in FIG. 1) is associated with the virtual control unit that is used as the vehicle engine control and is used to transmit signals between the electronic control device 1 and the engine. A second control interface 6 is associated with the virtual control unit used as the transmission control and is provided for transmitting signals between the electronic control device 1 and a transmission actuator assembly located outside electronic control device 1. In addition, a third control interface 7 is associated with the virtual control unit used as the evaluation electronics for the oil level sensor and is provided for transmitting signals between electronic control device 1 and the oil level sensor located outside electronic control device 1.

Each of the three memory areas 2, 3, and 4 has its own diagnostic address and its own programming address. In addition, central control device 8 has a diagnostic interface 12 and is designed so that, through the latter, using the addresses in the memory area associated with the respective address, the memory area can be accessed separately from outside. Through the diagnostic addresses, important working data can be updated, documented, or deleted for the respective virtual control units. Furthermore, the computer programs that form the basis of the respective virtual control units can be accessed through the programming addresses so that these can be updated independently from one another, in other words separately. In addition, the change of access of the central control device 8 to the respective memory areas 2, 3, and 4 takes place so rapidly that the electronic control device 1 according to the invention gives the external impression that the virtual control units are simultaneously available.

What is claimed is:

1. An electronic control device for controlling separate autonomously controllable assemblies, the electronic control device comprising:

a central control device having a diagnostic interface;

a memory having a plurality of non-intersecting memory areas, a diagnostic address and a programming address being assigned to each of said plurality of memory areas;

wherein said central control device includes a single microprocessor that operatively couples to each of said memory areas in a time multiplexed manner to form virtual control units, and further wherein said memory areas are accessed through the diagnostic interface separately from outside of the electronic control device using diagnostic and programming addresses associated with the respective memory area; and control interfaces, said control interfaces being operatively coupled with the central control device, the respective virtual control units having one of said control interfaces associated therewith.

2. The electronic control device according to claim 1, further comprising a public memory area which stores common data accessible by each of the respective virtual control units.

3. An electronic control device for a motor vehicle, comprising:

a central vehicle electronic unit having a diagnostic interface;

a memory having a plurality of non-intersecting memory areas, a diagnostic address and a programming address being assigned to each of said plurality of memory areas;

wherein said central vehicle electronic unit includes a single microprocessor that operatively couples to each of said memory areas in a time multiplexed manner to form virtual control units, and further wherein said memory areas are accessed through the diagnostic interface separately from outside of the electronic control device using diagnostic and programming addresses associated with the respective memory area;

control interfaces, said control interfaces being operatively coupled with the central vehicle electronic unit, the respective virtual control units having one of said control interfaces associated therewith; and autonomously controllable vehicle assemblies, each of said vehicle assemblies being operatively coupled with one of said control interfaces and being controlled thereby.

4. The electronic control device according to claim 3, further comprising a public memory area for storing common data accessible by each of the respective virtual control units.

5. The electronic control device according to claim 4, wherein a first of said virtual control units forms a motor vehicle engine control and a second of said virtual control units forms a motor vehicle transmission control.

6. The electronic control device according to claim 5, wherein a third of said virtual control units forms evaluation electronics for a vehicle oil level sensor.

7. The electronic control device according to claim 4, wherein a third of said virtual control units forms evaluation electronics for a vehicle oil level sensor.

8. The electronic control device according to claim 3, wherein a first of said virtual control units forms a motor vehicle engine control and a second of said virtual control units forms a motor vehicle transmission control.

9. The electronic control device according to claim 8, wherein a third of said virtual control units forms evaluation electronics for a vehicle oil level sensor.

10. The electronic control device according to claim 3, wherein a third of said virtual control units forms evaluation electronics for a vehicle oil level sensor.

* * * * *